Aug. 31, 1965  R. C. KIDD  3,203,692
WORK CLAMP FOR AUTOMATIC STRUCTURAL BAR
PUNCHING MACHINES AND THE LIKE
Original Filed Sept. 25, 1958  5 Sheets-Sheet 1

Inventor
Robert C. Kidd

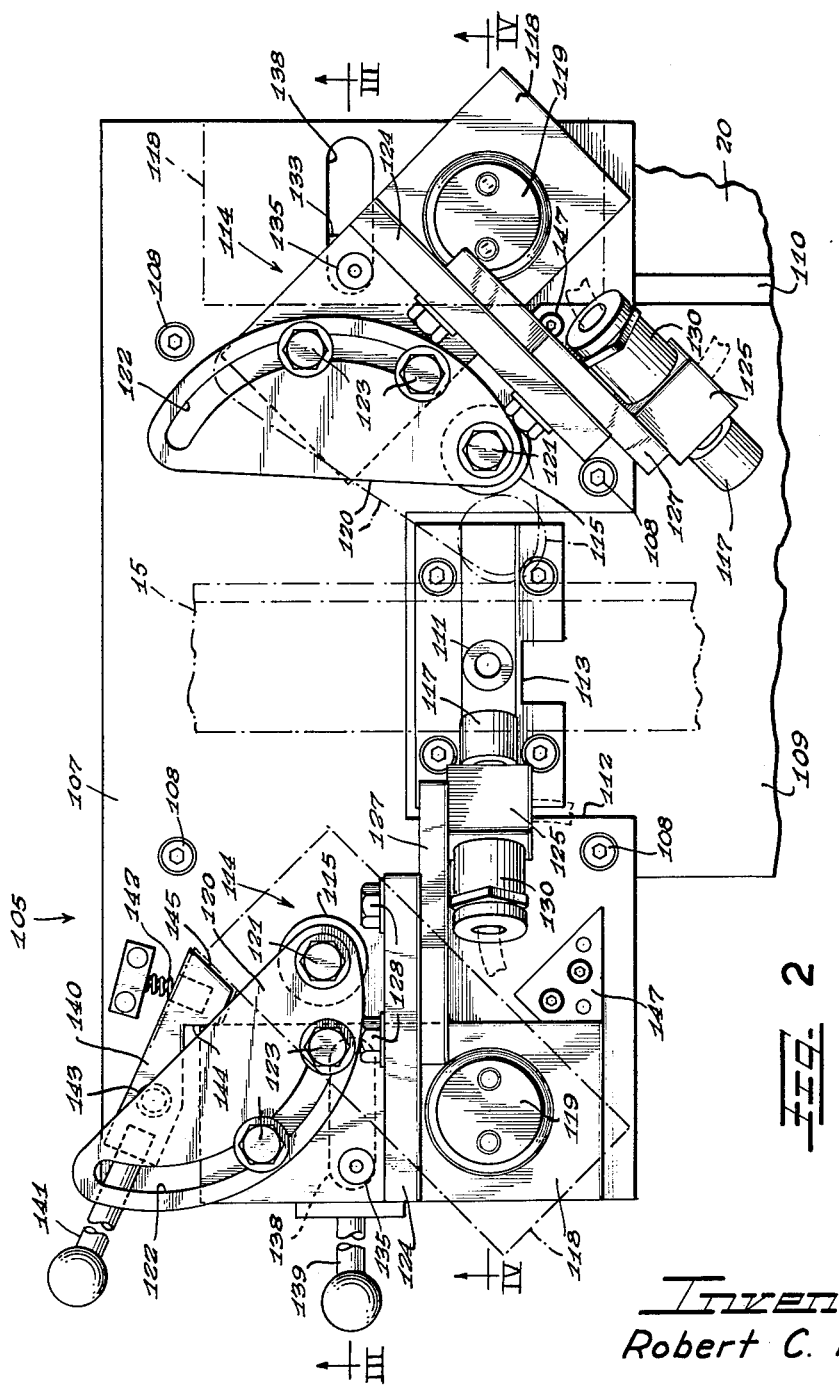

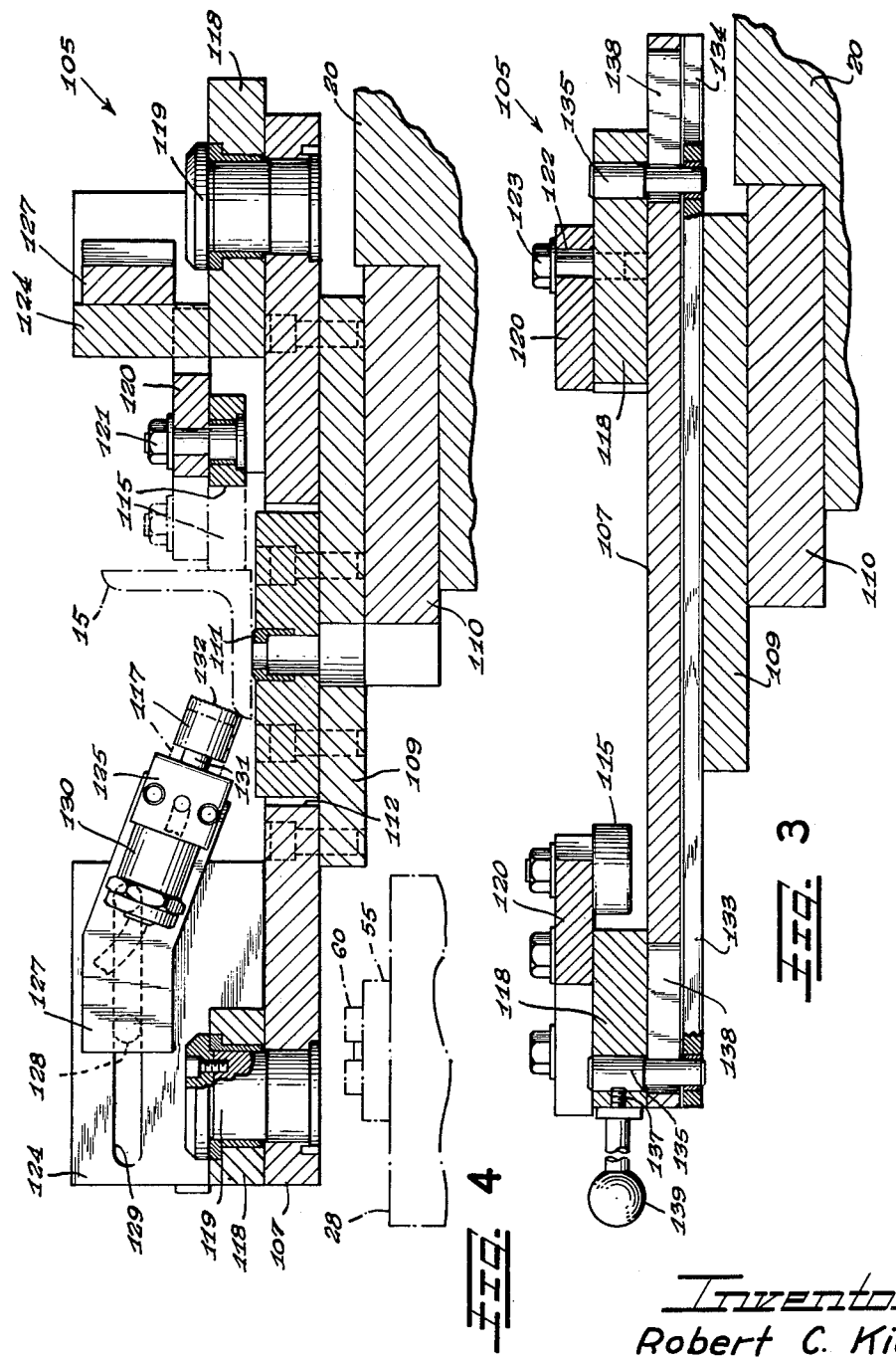

Inventor
Robert C. Kidd

Inventor
Robert C. Kidd

United States Patent Office 3,203,692
Patented Aug. 31, 1965

3,203,692
WORK CLAMP FOR AUTOMATIC STRUCTURAL
BAR PUNCHING MACHINES AND THE LIKE
Robert C. Kidd, Elmhurst, Ill., assignor to Mississippi
Valley Structural Steel Company, Decatur, Ill., a corporation of Illinois
Original application Sept. 25, 1958, Ser. No. 763,255, now
Patent No. 3,134,284, dated May 26, 1964. Divided
and this application Aug. 13, 1964, Ser. No. 389,501
8 Claims. (Cl. 269—152)

This invention relates to improvements in work clamping means adapted for use in machines such as for punching holes in steel bars used for various structural purposes.

The present application is a division of my application Serial No. 763,255 filed September 25, 1958, now Patent No. 3,134,284 dated May 26, 1964.

In machines such as employed in punching holes in steel bars adapted for use as building framework, road construction, bridges, and the like, a substantial problem is involved in holding the respective bars firmly, immovably during the punching operation.

It is accordingly an important object of the present invention to provide new and improved means for releasably gripping and clamping work pieces in a given orientation for work to be performed thereon.

Another object of the invention is to provide a new and improved work gripping and clamping device having opposed and shiftable gripping heads.

Still another object of the invention is to provide a new and improved work clamping apparatus which is hydraulically and electrically operated.

Other objects, features and advantages of the present invention will be readily apparent from the following detailed description of a preferred form thereof taken in conjunction with the accompanying drawings, in which:

FIGURE 2 is a top plan view of the bar gripping and gauging mechanism of the machine;

FIGURE 3 is a fragmentary vertical sectional detail view taken substantially on the line III—III of FIGURE 2;

FIGURE 4 is a fragmentary sectional elevational detail view taken substantially on the line IV—IV of FIGURE 2;

Figure 1:
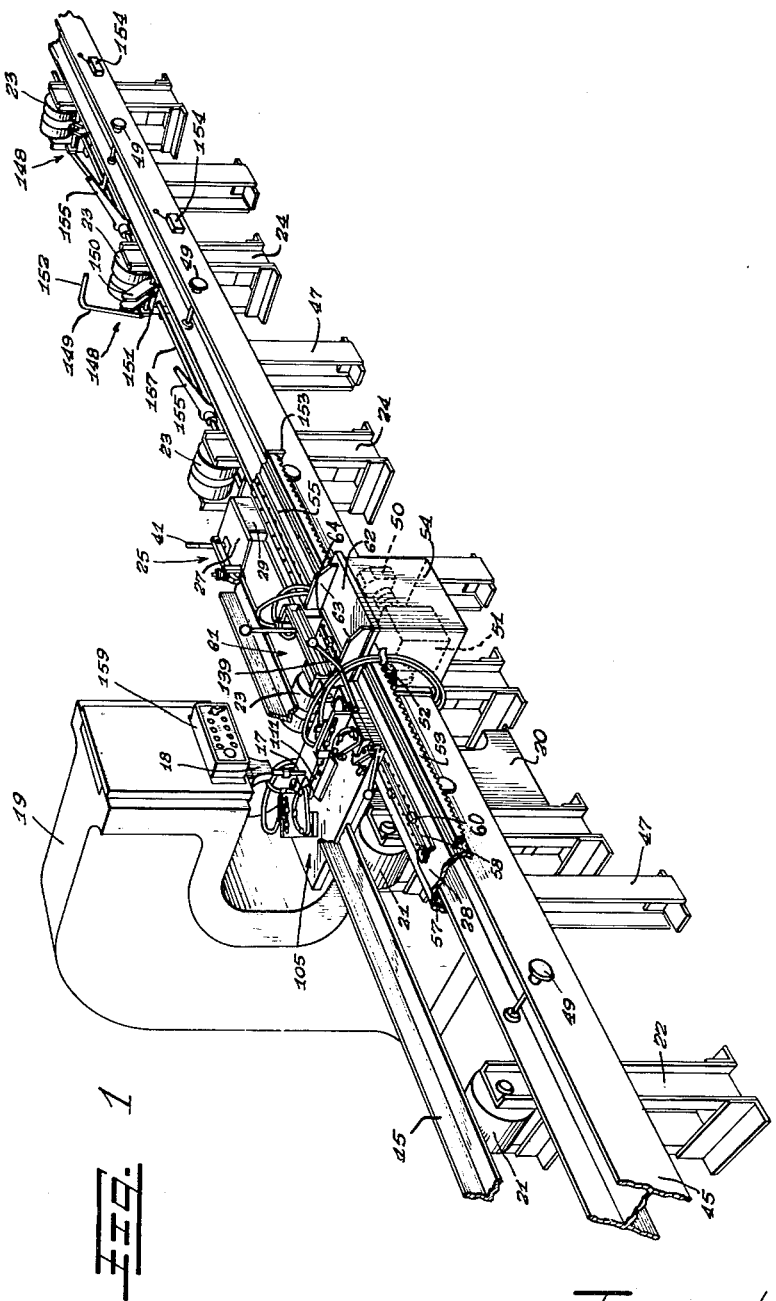
FIGURE 1 is a fragmentary perspective view of an automatically operable structural bar punching machine embodying features of the invention and with certain parts broken away and in section to illustrate details of structure.

Referring to FIGURE 1, a machine embodying features of the invention is preferably constructed and arranged for handling structural bars such as steel bars 15, of which an angular section bar is shown by way of example, for punching through the bars at predetermined intervals holes of suitable size for receiving attaching or connecting means such as bolts, screws and rivets by which the respective bars are connected to other structural components and into a structure in which the bars are utilized. While the machine is well adapted for punching holes in either or both of the flanges of an angle bar of the kind depicted, it is equally well adapted for punching holes in flat bars, or in the webs of channel bars or other shaped bars or beams in which a flange or longitudinal part of the bar of the bar is exposed accessibly to a punch 17 vertically reciprocably supported by a ram 18 carried by the head portion of a suitable C-frame type structural punch unit 19 having under the punch head an anvil portion 20.

This machine is adapted to handle and punch holes where desired in the flanges of the bar 15 substantially throughout its length. In practice bar lengths up to forty feet have been handled for punching but there is no limit upon practical bar lengths for which the machine capacity may be predetermined. To this end, the machine is equipped with a suitably spaced series of supporting idler rollers 21 mounted rotatably on roller standards 22 on one side of the punch unit 19, and a spaced series of idler rollers 23 carried by standards 24 on the opposite side of the punch unit. Each of the series of rollers 21 and 23 includes a sufficient number of rollers spaced at predetermined intervals such as five feet or less for a distance of as many feet from the respective sides of the center line of the punch unit 19 as desirable to handle bars to be punched of as great length as desired. This enables each of the successive bars 15 to be punched to be supported throughout its length and rolled into successive positions under the punch 17 and over the anvil 20 from end-to-end of the bar.

Means are provided for automatically advancing the bar 15 to be punched longitudinally from end-to-end under the punch 17, with suitable dwells at predetermined points along the length of the bar for punching of holes therein by the punch 17. For this purpose, a work gripper 25 is provided for engaging one end portion of the bar 15 mounted on a suitable carriage 27 supported by a travelling template carrier 28. In the present instance, the gripper 25 is shown as disposed at the right side of the punch unit 19 so as to be in a position to pull the bar 15 to be punched along the supporting rollers 21, under the punch 17 and onto the supporting rollers 23. In a convenient arrangement, the template carrier 28 is located in front of the punch unit 19 and the rollers 21 and 23, and the carriage 27 is in the form of a cantilever plate rigidly attached to the template carrier 28 through a spacer bar 29 and extending therefrom rearwardly into overlying relation to the rollers 23 and with the gripper 25 fixedly carried in longitudinal orientation centrally over the rollers 23 and aligned with a vertical axial plane through the punch 17 and extending through the centers of the rollers 21 and 23. Actuation of the gripper 25 is effected through a lever 41.

In an efficient form, the template and gripper carrying member 28 is in the form of an inverted channel of suitable width and of a length at least as long as the maximum length of the bar to be punched, the gripper carriage 27 being mounted on the head or leading end portion of the carrier 28. A suitable supporting and guiding structure for the carrier 28 comprises a continuous longitudinal frame 45, herein in the form of a continuous H-beam extending the full length of the machine forwardly alongside the series of rollers 21 and 23 and in front of the punch unit anvil 20 and carried by a suitably spaced series of supporting columns 47. The upstanding flanges of the frame member 45 are spaced apart less than depending longitudinal side flanges 48 of the carrier 28 and support flanged pairs of idler rollers 49 upon which the lower, free edges of the carrier flanges 48 ride for longitudinal reciprocable movement of the carrier 28 over the supporting frame 45.

Means for reciprocably advancing and returning the carrier 28 comprise powered actuating means including a hydraulic motor 50 and a reduction gear mechanism 51 driven thereby and drivingly connected to a gear 52 (FIG. 1) meshing with a rack 53 secured to the outer side and substantially throughout the length of the carrier 28. A housing 54 for the motor 50 and the reduction gear mechanism 51 is mounted upon the supporting frame 45 preferably adjacent to the starting position side of the punch unit 19.

On its upper face, the carrier 28 has secured longitudinally centrally thereof a template strip plate 55 extending throughout the length of the carrier and provided with two uniformly spaced relatively longitudinally alternately offset parallel series of upwardly opening template bores 57 located on respectively opposite sides of a narrow longitudinally extending divider and scale strip 58 on the upper surface of which suitable graduations by inches or other desirable scale indicia may be provided. Selectively engageable in the holes 57 are respective stems of gauge or template pin block 60 by which holes to be punched in the bars 15 are gauged. By preference, the blocks 60 are of rectangular form with opposite flat sides engageable with the divider strip 58 which thereby holds the blocks against turning out of the selected orientation.

Coactive with the template blocks 60 is indexing mechanism 61 which is constructed and arranged to control an electro-hydraulic circuit, presently to be described, for properly successively positioning the bar 15 to be punched with respect to the punch 17. For this purpose, the motor housing 54 carries a top plate 62 of substantial rigidity lying along its inner margin over the near or outer margin of the template carrier 28 and supporting adjacent to its opposite side margins respective supporting arm bars 63 which project into overlying relation to the central portion of the carrier 28 and more particularly the template strip 55. For maximum stability, extension portions of the table plate 62 may extend in underlying relation to the bars 63, with a cutout opening 64 exposing the carrier member 28 and the template strip 55.

As the bar 15 to be punched comes to a stop under the punch 17, a gripping device 105 firmly grips the same and holds it against lateral misalignment or shifting relative to the punch. For this purpose, the gripping assembly 105 comprises a unitary assembly including a carrying plate 107 which is suitably secured as by means of screws 108 to a bolster 109 mounted on a bed plate or block 110 on the anvil 20 of the punch unit. A punch die 111 is carried by the bolster 109 and is cleared by a cut-out 112 in the carrying plate 107. It will be noted (FIG. 2) that the supporting block for the punch die 111 has a clearance notch 113 on the side facing toward the opening in the clearance cut-out 112 and also facing toward the gripper 25 of the machine whereby to receive the jaw end of the gripper anvil bar as close as practicable to the die so that a hole can be punched quite close to the extremity of the bar 15 being worked upon.

According to the present invention, the work clamping device 105 is constructed and arranged for quick setting or resetting to accommodate work pieces of various widths or alternate flanges of the same work piece in successive punching passes through the machine. To this end, the clamping device 105 includes a pair of substantially identical relatively adjustable coactive, complementary clamping head units 114 mounted on respectively the front and rear portions of the supporting plate 107, in equally spaced respective opposite sides of the center line of work piece travel path as defined by the axis of the die 111. Each of the clamping heads 114 includes a work piece engaging and guiding as well as clamping roller 115, and a reciprocable pressing and work clamping plunger 117. The respective guiding and clamping rollers 115 and clamping plungers 117 of the two clamping heads 114 are so relatively disposed that in operation the respective rollers and plungers are coactively oriented in alignment with the punch die 111 on opposite sides of the bar 15 to be punched.

Mounting each of the clamping heads 114 is a preferably rectangular base plate 118 slidably pivotally attached to the underlying portion of the supporting plate 107 by means of a fairly large, stable diameter journal 119, and with both of the journals having their axes in a plane extending through the axis of the punch die 111. A major portion of the base plate 118 extends beyond the pivot 119 toward the work approaching side of the base plate 107 and provides slidably adjustable support for a clamping roller carrying, preferably sector shaped, supporting plate 120 to one end portion of which the associated roller 115 is rotatably attached underneath the supporting plate by means of a suitable journal pin or bolt structure 121. Along its curved side margin, the supporting plate 120 has a radius slot 122 through which extends a pair of attaching bolts 123 by which the supporting plate 120 is clampingly fixedly secured in any of a substantial range of adjusted positions relative to the base plate 118 as permitted by the length of the radius slot 122. As shown in FIG. 2, the two supporting plates 120 are in adjusted relation for accommodating work pieces of maximum width. As shown in dash outline, the right-hand supporting plate 120 in FIG. 2 has been adjusted to accommodate a substantially narrower work piece.

Between the pivot 119 and the supporting plate 120 an upstanding fin-like supporting bracket plate 124 provides support for the plunger 117 which is carried by a mounting block 125 secured to an adjustable preferably dog leg shaped rigid carrying arm 127 (FIGS. 2 and 4) having an angled generally downwardly diagonal leg portion on which the mounting block 125 is carried and a generally horizontal leg portion which is secured by means such as bolts 128 to the bracket plate 124, the bolts extending through a horizontal slot 129 in the bracket plate whereby the plunger unit can be adjusted horizontally toward and away from the die 111 as required for accommodating various width work pieces. Also carried by the mounting block 125 on the opposite side from the clamping plunger 117 is a fluid operator such as a hydraulic cylinder 130 within which is a piston from which projects a piston rod 131 to which the plunger 117 is rigidly connected. As shown, the plunger 117 in each instance is in its projected, work clamping position, from which it is adapted to be retracted by actuation of the fluid operator 130 for releasing the work piece. By the downwardly directed oblique axis disposition of the plunger 117, a preferably roughened, knurled clamping end face 132 on the plunger is adapted to make efficient downwardly and transversely pressing clamping engagement with the opposed side of the work piece to press the work piece solidly against the die 111 and against the opposing clamping roller 115 which engages the work piece on its opposite side from the plunger.

Means are provided for relatively repositioning the two clamping heads 114 in coordination for alternatively disposing the opposing guiding and clamping rollers 115 and the clamping plungers 117 in coactive opposition. Herein this is effected by means of a connecting bar or rod 133 (FIGS. 2 and 3) longitudinally movably disposed within a downwardly opening groove 134 in the supporting plate 107 and extending in a front to rear direction spaced from the die clearance cut-out 112 toward the work approaching side of the supporting plate. A motion transmission connection of each of the base plates 118 with the connecting bar 133 is effected by means of a suitable connecting pin fixedly secured to the respective base plate 118 as by means of a set screw 137 and depending through a clearance slot 138 in the supporting plate 107 into pivotal engagement with the adjacent end portion of the connecting bar 133. Through this arrangement, the base plates 118 are adapted to be swung in coordinated relation about their respective pivots 119 so that the base plate 118 which extends generally parallel with its end portion of the supporting plate 107, as shown in FIG. 2, presents its clamping plunger 117 for engagement with the work piece, and the remaining base plate 118 is disposed in a diagonal position, generally swung toward the work piece to present its clamping roller 115 for engagement with the work piece in coactive relation to the opposing plunger 117.

Means are provided for effecting relative setting and then retention of such setting of the clamping heads 114, herein comprising manually operable structure but which may readily comprise automatic actuating and holding means. Convenient manual structure comprises a setting handle 139 (FIGS. 1, 4 and 5) attached to the forward side of the base plate 118 at the front of the work guiding and clamping device 105 and located in sufficiently offset relation to the axis of the pivot 119 for ease in swinging the associated base plate 118 through the range of setting and resetting movement desirable. By means of the handle 139 when it is desired to reset the clamping heads 114 from the full line position shown in FIGURE 4, grasping and swinging of the handle 139 clockwise, correspondingly swings each of the base plates 118 about its pivot 119 and reorients the clamping heads 114 into the dash outline positions of the base plates 118 as shown. The reverse, counterclockwise swinging of the handle 139 returns the clamping heads to the full line position shown.

In either operative setting of the clamping heads 114, holding means, herein in the form of a manually releasable latch 140 retains the assembly in the desired setting. In an effective form, the latch 140 comprises a lever pivotally mounted on the supporting plate 107 beyond the roller supporting end portion of the base plate and under the overlying end portion of the roller carrying sector plate 120, with an actuating handle 141 of the latch extending into convenient actuating position at the forward side of the machine. Biasing means in the form of a compression spring 142 thrusts the latch member 140 about a pivot 143 toward and into latching engagement with the contiguous base plate 118 so that in the setting shown in full outline in FIGURE 4 a latching shoulder 144 on the latch member engages with the adjacent corner of the base plate and thus holds the base plate against unintentional swinging out of the selected setting. During resetting of the clamping heads, the latch 140 is swung counterclockwise out of latching position by manipulating the handle 141 to overcome the biasing spring 142 to clear the latch from the engaged corner of the base plate 118 as shown in full outline. After the clamping heads have been reset into the dash outline position, the released latch 140 snaps into holding relation to the adjacent canted side of the associated base plate 118, being provided for this purpose with an end latching shoulder 145.

Coactive with the latch 140 in holding the clamping heads 114 in firm, stable selective setting, is a pair of fixed abutments 147 respectively disposed for engagement with the end portion of the clamping member side of each of the base plates 118 when the associated base plate is in its respective parallel disposition relative to the adjacent end of the supporting plate 107. For this purpose, the abutment 147 associated with the base plate 118 at the front side of the supporting plate 107 is carried by the supporting plate in position to be engaged by the associated base plate 118 in the full line position shown in FIGURE 2, while the remaining abutment 147 is carried by the supporting plate 107 in position to engage the associated base plate 118 when it is in the dash line position shown.

After the last hole has been punched in the bar 15 and the trailing end of the bar has been cleared from the punch, the bar is released from the gripper 25 and removed from the machine. This is preferably effected automatically by means associated with the work conveying section of the machine embodying the supporting rollers 23. To this end, a combination gripper release and bar stop unit 148 (FIG. 1) is activated at a suitable distance from the punch unit 19. By preference a plurality of the gripper release and stop units 148 is provided at suitably graduated longitudinally spaced intervals along the conveyor provided by the rollers 23 to accommodate various lengths of work piece. In each instance, the unit 148 comprises a generally inverted L-shaped release arm 149 and a stop bar structure 150, both mounted pivotally on a rock shaft 151 pivotally supported on one of the roller carrying standards 24 in suitable position to be moved from an out of the way, inactive position as shown at the far right end of FIGURE 1 into an active position as shown with the first of the units 148 in the series. In the active position, the arm 149 extends upwardly with a transverse angular head 152 disposed in the path of the gripper latch arm 41. As the carrier 28 moves the gripper 25 under the release arm head 152, the latch arm 41 is swung down by engagement with the release arm head and thus opens the gripper jaws to release the punched bar 15. The gripper 25 continues to move on and the stop bars 150 engage the end of the bar 15 and positively strip the same from the gripper, should there be any tendency to stick in the gripper jaws, and more importantly to restrain the bar against possible momentum-induced onward travel.

Figure 5:
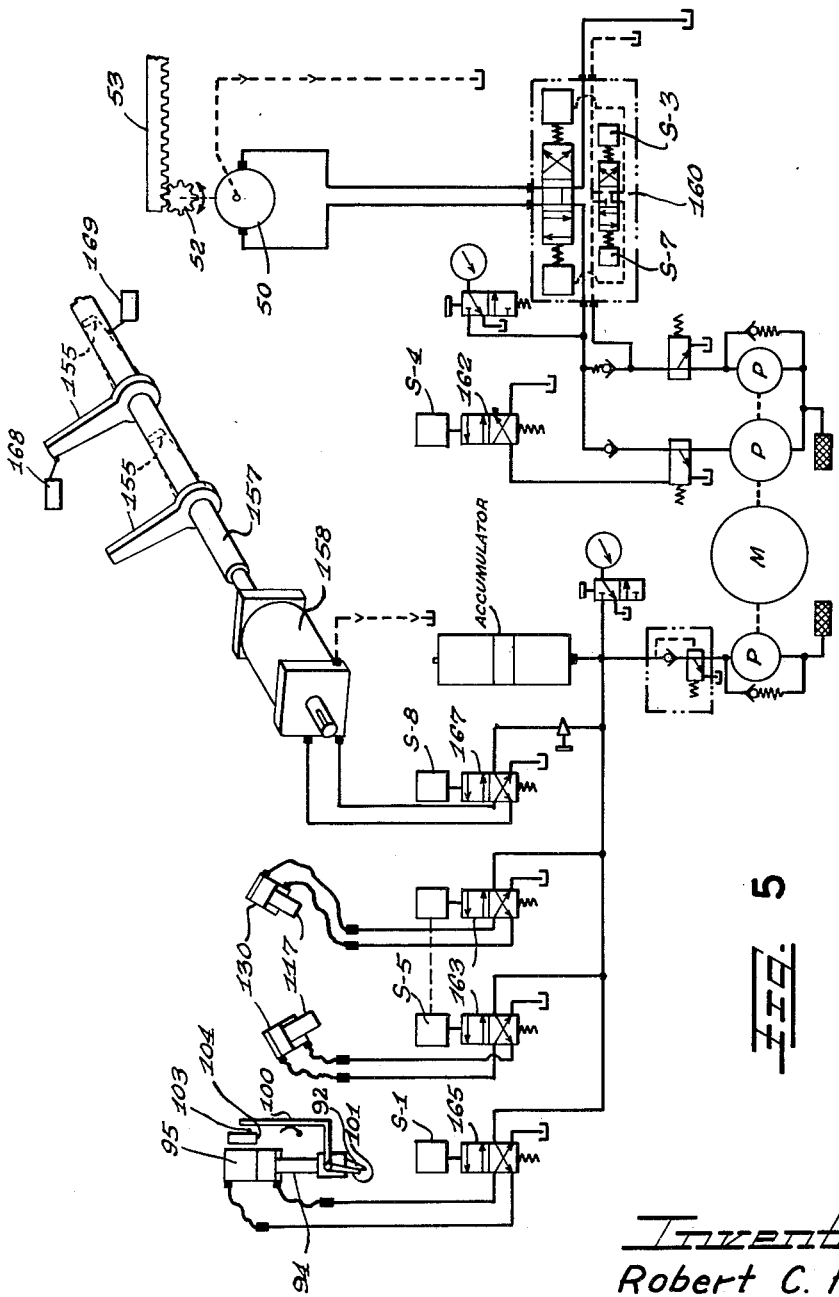
FIGURE 5 is a more or less schematic electrohydraulic operating diagram.

Close to the point where the gripper 25 is released from the bar 15 by the release and stop mechanism unit 148, a trip finger 153 carried by the advancing end of the rack 53 engages and trips the actuating arm of a limit switch 154 which not only controls the operating circuit of the machine to halt advance of the carrier 28 but also activates the circuit to operate a work ejector comprising a longitudinally spaced series of ejector arms 155 fixedly carried by a common shaft 157 rotatably mounted on the roll supporting standards 24 and adapted to be rotated by suitable means such as a hydraulic motor 158 (FIG. 5). Normally the ejector arms are disposed to lie in clearance relation at the forward side of the advancing work piece. During ejecting or unloading action, the ejector arms 155 are swung toward the rear of the machine to thereby dump the punched work piece from the supporting rollers 23. At the end of their work unloading action, the ejector arms 155 are promptly returned to their starting or ready position, and the carrier 28 returns to its starting position for another working cycle.

Figure 6:
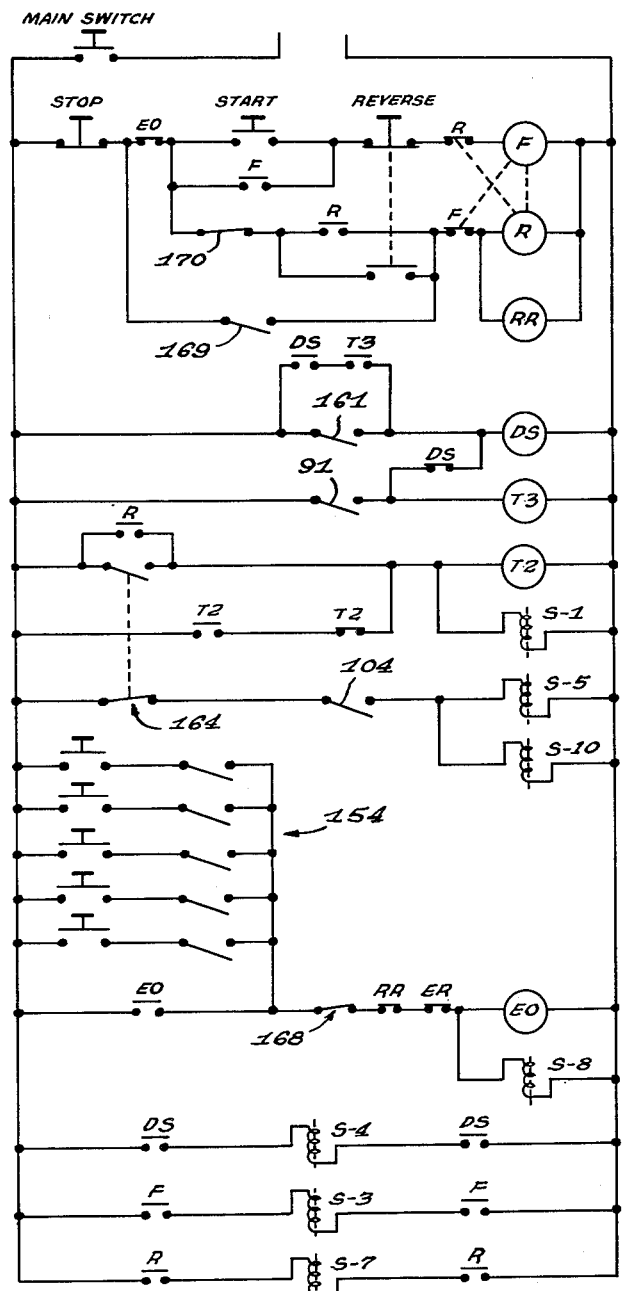
FIGURE 6 is a simplified electrical wiring diagram.

A combination of hydraulic and electrical circuits is utilized in cyclically, automatically operating the machine, and these circuits are shown schematically and diagrammatically in FIGURES 5 and 6. In the hydraulic circuit of FIGURES 5, standard symbols have been used. A simplified electrical diagram is shown in FIGURE 5. For ready correlated identification, the various contacts and switches controlled by the several relays and timers bear the same letter or letter and numeral combination references.

Assuming that the master switch has been closed and that the motor driving the several hydraulic pumps is operating and the carrier 28 is in starting position, the person operating the machine loads one of the work pieces 15 onto the rollers 21 (FIG. 1) and engages and locks the end of the work piece in the gripper 25, the forward or advance end portion of the work piece being guidably disposed between the clamping heads 114, with the operatively disposed clamping plunger 117 retracted by its fluid operator 130. The operator then pushes the "start" button to initiate an automatic cycle of operation of the machine as controlled by the electrical circuit of FIGURE 6. Should anything go wrong, the operator can instantly stop the machine by pressing the "stop" button. The various electrical circuit control buttons may be conveniently mounted on a control panel 159 carried by the front of the head of the punch unit 19 (FIG. 1) or on any other convenient place on the machine, such for example, as on the table 62 at the front of the machine.

Closing of the "start" switch closes the circuit for energizing relay F which generally controls forward movement of the carrier 28 by closing switches F to energize a solenoid S-3 which motivates hydraulic control valve mechanism 160 (FIG. 5) for opening a hydraulic circuit to drive the hydraulic motor 50 for moving the carriage 28 forwardly. Since generally holes must be punched in the leading end portion of the work piece, it is desirable to advance the carrier at initially slow or creep speed, and therefore means (not shown) associated with the carrier 28 initially holds closed a normally open limit switch 161 controlling energizing circuit for a relay DS which while energized closes switch contacts in a circuit controlling a solenoid S-4 which is thus energized to open a pressure relief valve 162 whereby forward movement of the carrier 28 is at creep speed. Should there be no punching of the work piece required within a short travel span after starting of forward movement of the carrier 28, the limit switch 161 opens, deenergizing relay DS and thus the solenoid S-4 and as a result full hydraulic pressure to the motor 50 causing driving of the carrier 28 at rapid forward speed.

In the index mechanism 61 an advancing one of the adjustably positionable template members 60 effects closing of a limit switch 91, and a circuit for energizing the relay DS is closed, thus effecting energization of solenoid S-4 and forward movement of the carrier 28 at creep speed. This also effects energization of a timer T3 which acts to hold the energizing circuit for the relay DS closed after normally open limit switch 91 opens by advance of the tripping template member 60 beyond the switch actuator.

The advancing template member 60 then comes into engagement with the stop finger 92 on a plunger 94 adapted to be actuated by a fluid operator 95 and trips the switch actuating arm 100 which engages the trip pin 103 and closes the normally open limit switch 104. This energizes a solenoid or solenoids S-5 for operating respective hydraulic control valves 163 for supplying hydraulic fluid to the hydraulic operators 130 and projecting the selected active clamping plunger 117 into clamping engagement with the work piece. At the same time there is energized a circuit for a solenoid S-10 in control of means by which the customary clutch associated with the punch unit 19 is activated to effect a punching stroke of the punch ram 18 and thus punching of the work piece 15 at the predetermined point by coaction of the punch 17 with the die 111.

On return of the punch 17 and its ram 18 from the punching stroke, a double acting relay switch 164 is suitably actuated thereby to deenergize the solenoids S-5 and S-10, thus effecting retraction of the work clamping plunger 117 and halting of the punch, and at the same time closing a circuit to energize a timer T2 and a solenoid S-1 by which a hydraulic control valve 165 is actuated to effect hydraulic return of the stop plunger 93 through action of the fluid operator 95. The timer T2 effects a time delay in deenergization of the solenoid S-1 long enough to clear the template member 60 from which the stop finger 92 has been released.

If a succeeding template member 60 now effects actuation of the limit switch 91, the carrier 28 moves forwardly at creep speed until another punching cycle is initiated by the limit switch 104. In the absence of an immediately acting template member 60, the carrier 28 moves forwardly at rapid speed until the next succeeding template member 60 acts on the trip arm 80.

After the work piece has passed beyond the punch press, and the gripper 25 has been released from the work piece and the work piece stopped by the release and stop mechanism 148, the carrier 28 moves on to the preselected limit switch 154. It may be observed that preselection is effected herein by means of a suitable manual switch, for each of the limit switches 154, located at the electrical control station afforded by the control panel 159.

Upon closing of the preselected limit switch 154 by the trip 153 of the carrier, a relay EO is energized, which effects deenergization of the relay F as well as the solenoid S-3 so that the hydraulic motor 50 is stopped and the carrier 28 halted. At the same time, the relay EO energizes a solenoid S-8 operating a hydraulic control valve 167 for directing hydraulic fluid to operate the hydraulic motor 158 to actuate the rock shaft 157 and thereby the ejector arms 155 to eject the punched work piece. At the end of the ejecting action of the arms 155, a limit switch 168 is opened to deenergize the relay EO and thus the solenoid S-8, whereby the hydraulic control valve 167 shifts to the ejector return position and the ejector arms 155 are swung back to the ready position wherein a normally open limit switch 169 is closed to energize relays R and RR and a solenoid S-7 is energized to actuate the control valve mechanism 160 for hydraulically reversing the hydraulic motor 50 for returning the carrier 28 at rapid speed toward starting position. Near the end of the return traverse of the carrier 28, the limit switch 161 is closed to energize the relay DS and thereby the solenoid S-4 for thereby slowing the carrier down to creep speed until the carrier effects opening of a limit switch 170 to deenergize the relays R and RR and thereby the solenoid S-7 to bring the carrier to a halt at starting position.

If it is desired to return the carrier 28 before the work piece has been released therefrom, as where double flange or double row punching of the work piece is to be effected, the operator actuates a "reverse" switch before the gripper 25 reaches the preselected release arm 149, 152. This causes the relay F to be deenergized and the relay R to be energized for rapid return of the carrier and the work piece still clamped in place relative thereto.

Although herein the machine is shown as including a punch press, which is especially well suited for making holes in light and medium weight materials, heavier materials may require a drill press for making the holes. It will be readily apparent that a drill press could be substituted for the punch press without significant change in structure of the other components of the machine. Therefore, "punching" should be considered herein as including drilling or other desirable hole or aperture forming expedient.

It will be understood that modifications and variations may be effected without departing from the scope of the novel concepts of the present invention.

I claim as my invention:

1. In apparatus of the character described wherein a work piece is required to be held in position for work to be performed thereon,
   a work supporting structure,
   a pair of relatively shiftable gripping heads each having a reciprocable gripping plunger and a work gripping roller mounted to grip a work piece on said work supporting structure, and means for selectively positioning said heads for alternative coaction of the respective rollers and plungers thereof for gripping a work piece located therebetween on said work supporting structure.

2. In apparatus of the character described wherein a work piece is required to be held in position for work to be performed thereon,
   a work supporting structure,
   a pair of relatively shiftable gripping heads each having a reciprocable gripping plunger and a work gripping roller mounted to grip a work piece on said work supporting structure,
   and means for selectively positioning said heads for alternative coaction of the respective rollers and plungers thereof for gripping a work piece located therebetween on said work supporting structure,
   each of said heads being pivotally mounted and connected to a connecting bar by which they are coordinately shiftable.

3. In apparatus of the character described wherein a work piece is required to be held in position for work to be performed thereon,
   a work supporting structure,
   a pair of gripping heads and turrets supporting said gripping heads on opposite sides of said position,
   each of said gripping heads having a reciprocable gripping plunger and a work gripping member and means for indexably selectively positioning said heads by pivoting of the turrets in correlated relation for coaction of the work gripping member of one of the heads and the plunger of the other of the heads to grip a work piece located therebetween in said position.

4. Apparatus as defined in claim 3, wherein said selective positioning means include a handle and a coordinating bar.

5. In apparatus of the character described wherein a work piece is required to be held in position for work to be performed thereon,
a work supporting structure,
a pair of gripping heads and turrets supporting said gripping heads on opposite sides of said position,
each of said gripping heads having a reciprocable gripping plunger and a work gripping member and means for indexably selectively positioning said heads by pivoting of the turrets in correlated relation for coaction of the work gripping member of one of the heads and the plunger of the other of the heads to grip a work piece located therebetween in said position,
and latching means for retaining the turrets in selected operative positions.

6. In apparatus of the character described wherein a work piece is required to be held in position for work to be performed thereon,
a work supporting structure,
a pair of relatively shiftable gripping heads each having a reciprocable gripping plunger and a work gripping roller mounted to grip a work piece on said work supporting structure,
means for selectively positioning said heads for alternative coaction of the respective rollers and plungers thereof for gripping a work piece therebetween on said work supporting structure,
and means for relatively adjusting the rollers and plungers of each of the gripping heads to accommodate different sized work pieces.

7. Apparatus as defined in claim 6, wherein said adjusting means comprise a base plate and a sector plate and means for adjustably securing said plates.

8. In apparatus of the character described wherein a work piece is required to be held in position for work to be performed thereon,
a work supporting structure,
a pair of relatively shiftable gripping heads each having a reciprocable gripping plunger and a work gripping roller mounted to grip a work piece on said work supporting structure,
and means for selectively positioning said heads for alternative coaction of the respective rollers and plungers thereof for gripping a work piece located therebetween on said work supporting structure,
said gripping plungers being angled downwardly and thereby thrusting the work piece downwardly as well as toward the opposing gripping roller.

References Cited by the Examiner
UNITED STATES PATENTS

| | | | |
|---|---|---|---|
| 636,223 | 10/99 | Landon | 269—25 X |
| 2,531,039 | 11/50 | Hardie | 81—178 |
| 2,729,879 | 1/56 | Sampson | 214—1.4 X |
| 2,781,573 | 2/57 | Espari | 83—282 X |
| 3,025,740 | 3/62 | Sorkin | 83—282 |

HUGO O. SCHULZ, *Primary Examiner.*
MARVIN A. CHAMPION, *Examiner.*